Nov. 22, 1960     B. C. REED     2,960,791
TOY
Filed May 21, 1959
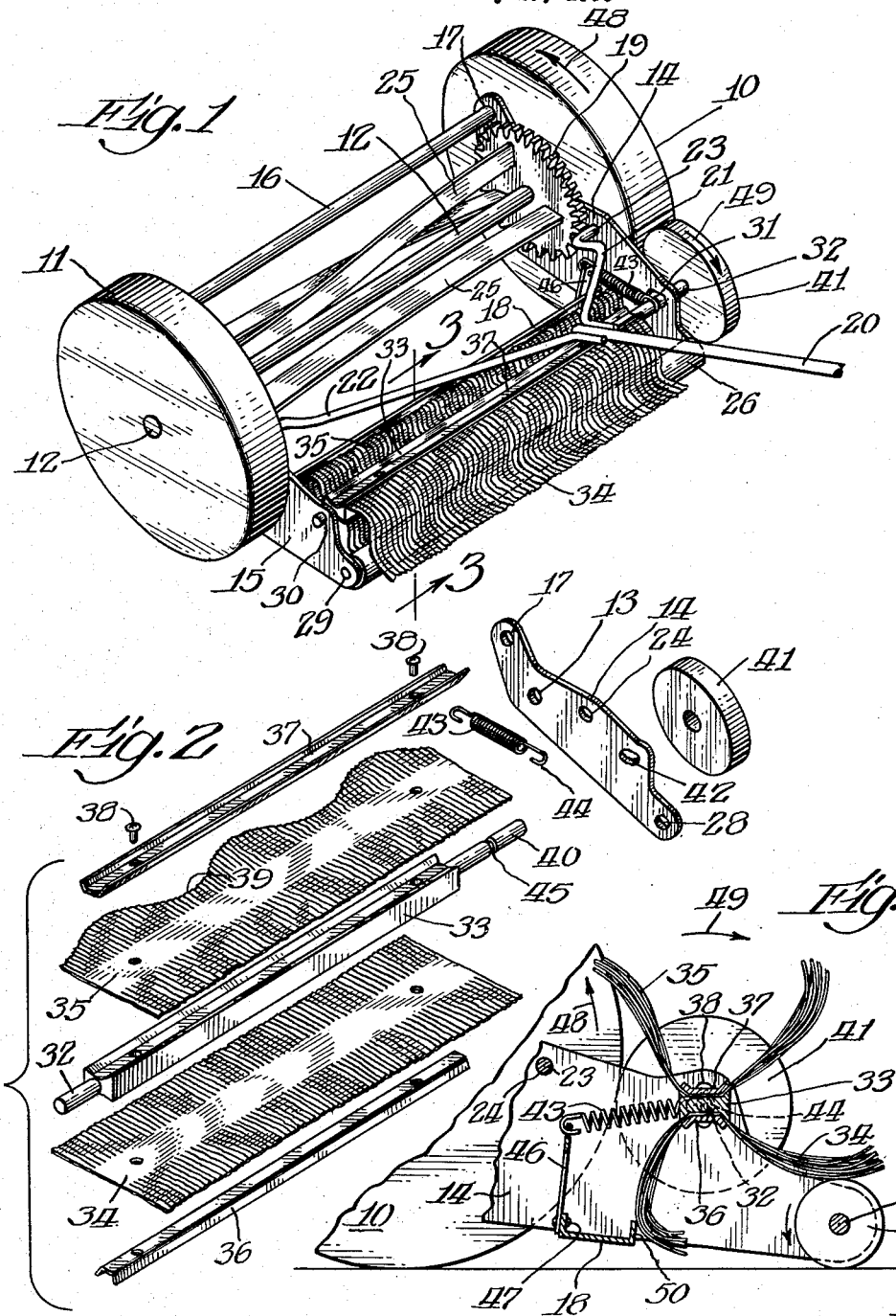
Inventor:
Bayard C. Reed
By Soans, Anderson, Luedeka
& Fitch attys.

United States Patent Office 2,960,791
Patented Nov. 22, 1960

2,960,791

TOY

Bayard C. Reed, Chicago, Ill., assignor to
Marvin I. Glass, Chicago, Ill.

Filed May 21, 1959, Ser. No. 814,775

5 Claims. (Cl. 46—39)

This invention relates to a toy designed to simulate in appearance and in operation a grass mower having a reel mounted on a horizontal axis.

Grass mowers of the reel type are of two kinds. The forward overhead delivery type has a reel driven in the same direction as the ground wheels of the mower, usually by means of a chain. The rearward delivery type is usually driven by means of gears. Although the invention is capable of use in connection with other reel-type mowers, it will be described as applied to a simulated hand-power grass mower of the rearward delivery type.

An important feature of the invention resides in the provision of an auxiliary axially horizontal rotary element provided with outwardly extending blades or shreds of sheet material, the outer ends of which create the illusion of cut grass discharged from the mower when the rotary element is actuated, as an incident to the propulsion of the toy over the surface of the ground or floor.

Other features of the invention, incidental or otherwise, will appear as the description proceeds.

In the drawings accompanying this description, and showing one of the preferred embodiments of the invention:

Figure 1 is a perspective view of the toy;

Figure 2 is a disassembled, perspective view of certain parts of the rotary element on which the grass simulating elements or brushes are mounted; and Figure 3 is a fragmentary, sectional view taken in the direction of the arrows 3—3 of Figure 1.

Referring to the drawings, the toy incorporates suitable support or chassis means including a pair of ground-engaging wheels 10 and 11 mounted on an axle 12, the ends of which are journalled in bearings, such as 13, provided in the side frames 14 and 15. Said frames 14 and 15 are united together at their upper forward ends by means of a spacing rod 16 mounted in holes such as 17 at the forward upper ends of the said side frame elements 14 and 15. At their lower rearwardly extending ends, the side frames 14 and 15 are further connected together by means of a channel-shaped trough 18 which also has the function of a baffle, as will hereinafter appear.

In connection with one of the wheels 10 and 11, there may be provided a noise-making device of a conventional type which may include a gear element 19 with a cooperating dog or snapping element, or other similar device, not shown.

The toy may be pushed in a forward direction by means of a push rod 20 to the forward end of which there are secured a pair of arms 21 and 22, the ends of which are turned outwardly, as shown at 23, in order to enter holes such as 24 in the side frame elements 14 and 15. Also, to the shaft 12 there may be secured a series of obliquely extending bars such as 25 which are intended to simulate the appearance of the rotary cutter bars of a conventional lawn mower of the reel type. However, the simulated cutter bars 25 are not essential to the grass-discharge-simulating feature.

The rear end of the chassis is supported by a floor-engaging roller 26 which is mounted to rotate on a rod 27 which extends through holes 28 and 29 in the rear ends of the side frames 14 and 15 of the chassis. Said side frames 14 and 15 also serve the purpose of providing bearings 30 and 31 for rotatably supporting the opposite outer ends of an auxiliary shaft 32 extending through and fixed in a rotary element in the form of an I-bar 33, located between the side frames 14 and 15.

To the opposite sides of the I-bar 33 there are applied a pair of outwardly extending brush-like elements 34 and 35, each formed of one or more (in this case one) thin sheets of flexible and resilient plastic material. The outer portions are shredded or divided into narrow strips, strands or blades of a width approximating the width of an ordinary blade of lawn grass. Said brush elements 34 and 35 are secured to the I-bar 33 by means of channel-shaped strips 36 and 37 and rivets such as 38. If desired, one or more edges of one or more of the brush elements may be made with a scalloped edge, as indicated at 39.

To the end 40 of the shaft 32 there is secured a small wheel or pulley 41 and the said shaft end 40 extends through a slot 42 in the side frame 14, the distance between the axis of the shaft 40 and the axis of the shaft 12, which are parallel, being such that when the pulley 41 is in a position where it engages the periphery of the ground wheel 10, the shaft 40 will be properly accommodated in the slot 42. A coiled wire tension spring 43 tends to pull the shaft 40 forwardly as indicated in Figure 3, so that the pulley 41 is pressed resiliently against the outer periphery of the ground wheel 10. The rear end of said spring 43 has a hook 44 which has a free bearing in a groove 45 in the shaft 40, and the other end of said spring 43 is hooked onto the upper end of an arm 46, the lower end of which is riveted to the forward flange 47 of the channel-shaped baffle member 18.

The operation

When the toy is propelled forwardly by pushing on the handle 20, the unit rolls over the ground or floor, being supported at its rear end by the roller 26 and at its front end by the ground-engaging wheels 10 and 11. These ground-engaging wheels consequently rotate in the direction of the arrow 48 with the result that the wheel 41 and shaft 32 will be rotated in the opposite direction, i.e. in the direction of the arrow 49. Consequently, the brush elements 34 and 35 will also rotate in the direction of the arrow 49.

As a result, the resilient ends or blades of the brushes will successively engage the rear upstanding flange 50 of the baffle member 18 in the manner indicated in Figure 3, and then, after a forward rotary movement of the shaft 32, the ends of the blades will flick past the upper edge of the flange 50. Then, the tips of the blades will be thrown out upwardly and forwardly until they are about on the same level as the shaft 32. From this point on, forward rotation will cause the ends of the brush elements to move upwardly and rearwardly until finally the ends will strike the upper surface of the roller 26, after which the same cycle of operations will be repeated. This will be true in the case of each of the four outwardly projecting portions of the brush elements 34 and 35.

The plastic brush elements 34 and 35 are colored grass-green and thus simulate the ejection or discharge of cut grass from the lower periphery of the cylindrical path of the cutter bars 25, thus simulating an ordinary lawn grass mower. To enhance the similarity, it may be advisable to scallop the outer edge of one or more of the brush elements, as indicated at 39 in Figure 2, so that some of the tips of the blades will flick or snap past the flange 50 of the baffle 18 at different times. Also, in order to vary further the appearance of the grass discharge effect, certain portions of the brush elements 34 and 35 may be colored a lighter or darker shade of green, and certain portions also may be made with a matte finish and others with a polished or glossy finish.

Various of the features of the invention believed to be new are set forth in the appended claims.

I claim:

1. In a toy lawn mower movable over a supporting surface, the combination of support means, a simulated reel-type cutting element carried by said support means, and cut-grass simulating means carried by said support means, said cut-grass simulating means comprising a shaft, a plurality of exposed elongated strands of flexible material which are colored to simulate grass, each of said strands being connected at one end to said shaft, said strands being distributed longitudinally of said shaft and being exposed so as to be observable by the person operating the toy, and means for rotating said shaft incident to the movement of the toy lawn mower over the supporting surface.

2. In a toy lawn mower movable over a supporting surface, the combination of support means, a simulated reel-type cutting element carried by said support means, and cut-grass simulating means carried by said support means, said cut-grass simulating means comprising a shaft, a plurality of exposed elongated strands of flexible material which are colored to simulate grass, each of said strands being connected at one end to said shaft, said strands being distributed longitudinally of said shaft and being exposed so as to be observable by the person operating the toy, means for rotating said shaft incident to the movement of the toy lawn mower over the supporting surface, and a member on said lawn mower located in the path of travel of said strands so that the rotation of said shaft causes said strands to engage said member so that a portion of each of said strands is momentarily retarded in its travel relative to another portion of that strand as they move past said member.

3. In a toy lawn mower movable over a supporting surface, the combination of support means, a simulated reel-type cutting element carried by said support means, and cut-grass simulating means carried by said support means, said cut-grass simulating means comprising a shaft, a plurality of exposed elongated strands of flexible material which are colored to simulate grass, each of said strands being connected at one end to said shaft, said strands being distributed in rows that are substantially coextensive with said shaft, each of said rows comprising a plurality of said strands arranged in close proximity to one another, said rows being disposed parallel to the axis of said shaft and spaced around the periphery thereof, said strands being exposed so as to be observable by the person operating the toy, and means for rotating said shaft incident to the movement of the toy lawn mower over the supporting surface.

4. In a toy lawn mower movable over a supporting surface, the combination of support means, a simulated reel-type cutting element carried by said support means, and cut-grass simulating means carried by said support means, said cut-grass simulating means comprising a shaft, a plurality of exposed elongated strands of flexible material which are colored to simulate grass, each of said strands being connected at one end to said shaft, said strands being distributed longitudinally of said shaft and being exposed so as to be observable by the person operating the toy, said strands being limp when at rest and outwardly extending when said shaft is rotated, and means for rotating said shaft incident to the movement of the toy lawn mower over the supporting surface.

5. A toy lawn mower movable over a supporting surface comprising a pair of side chassis members, a pair of wheels rotatably mounted on said chassis members, transverse elements which include a simulated grass-cutting element and which extend between said side chassis members, and cut-grass simulating means connected to said chassis members, said means comprising a shaft disposed in generally parallel relation to said simulated grass-cutting element, a plurality of exposed elongated strands of flexible material which are colored to simulate grass, each of said strands being connected at one end to said shaft, said strands being distributed longitudinally of said shaft and being exposed so as to be observable by the person operating the toy, and means connected with said shaft for rotating said shaft incident to the movement of the toy lawn mower over the supporting surface, one of said transverse elements being located in the path of travel of said strands, whereby rotation of said shaft causes said strands to engage said one element inwardly of their ends so that a portion of each of said strands is momentarily retarded in its travel relative to another portion of that strand as said strands move past said one element.

References Cited in the file of this patent

UNITED STATES PATENTS

| 1,933,501 | Allen | Oct. 31, 1933 |
| 1,977,457 | Smith | Oct. 16, 1934 |
| 2,288,952 | Kinsella | July 17, 1942 |

FOREIGN PATENTS

| 536,514 | Canada | Jan. 29, 1957 |